United States Patent [19]

Tan et al.

[11] Patent Number: 5,264,315
[45] Date of Patent: Nov. 23, 1993

[54] PROCESS FOR THE CONTINUOUS PREPARATION OF ENCAPSULATED TONER

[75] Inventors: Hock S. Tan, Burlington; Hadi K. Mahabadi, Toronto; Joseph D. Wright, Burlington, all of Canada

[73] Assignee: Xerox Corporation, Stamford, Conn.

[21] Appl. No.: 871,156

[22] Filed: Apr. 20, 1992

[51] Int. Cl.$^5$ ............................................. G03G 9/093
[52] U.S. Cl. ...................................... 430/137; 430/138
[58] Field of Search ................ 430/109, 137, 138, 111; 503/215

[56] References Cited

U.S. PATENT DOCUMENTS

| | | | |
|---|---|---|---|
| 4,465,756 | 8/1984 | Mikami et al. | 430/138 |
| 4,668,580 | 5/1987 | Dahm et al. | 503/215 |
| 4,727,011 | 2/1988 | Mahabadi et al. | 430/138 |
| 4,816,366 | 3/1989 | Hyosu et al. | 430/137 |
| 4,851,318 | 7/1989 | Hsieh et al. | 430/137 |
| 4,937,167 | 6/1990 | Moffat et al. | 430/137 |
| 4,954,412 | 9/1990 | Breton et al. | 430/137 |
| 5,017,451 | 7/1991 | Larson | 430/137 |
| 5,035,970 | 7/1991 | Hsieh et al. | 430/109 |
| 5,037,716 | 8/1991 | Moffat | 430/109 |

Primary Examiner—John Goodrow
Attorney, Agent, or Firm—E. O. Palazzo

[57] ABSTRACT

A process for the continuous preparation of an encapsulated toner comprised of a core comprised of polymer and pigment encapsulated within a polymer shell, which process comprises continuously separately feeding an oil phase containing core monomers, oil soluble shell monomers and pigment and an aqueous phase containing surfactant into a continuous flowthrough mixing tank; homogenizing the aforementioned two phases to enable small oil droplets with an average diameter of from between about 3 to about 25 microns; overflowing the resulting droplets to at least one continuously stirred tank reactor while simultaneously feeding water soluble shell monomer to said stirred reactor to effect interfacial polymerization thereby causing shell formation; and thereafter allowing the encapsulated droplets to flow into a reactor or reactors and heating the reactor or reactors to effect free radical polymerization of the core monomers, followed by cooling, and isolating the said encapsulated toner.

24 Claims, 1 Drawing Sheet

PROCESS FOR THE CONTINUOUS PREPARATION OF ENCAPSULATED TONER

BACKGROUND OF THE INVENTION

The present invention is generally directed to toner compositions, and more specifically to encapsulated toner compositions and processes thereof. In one embodiment, the present invention is related to processes for the continuous preparation of encapsulated toner compositions comprised of core components such as, for example, polymer resins, and colorants comprised of magnetic pigments, dyes, color pigments or mixtures thereof, and thereover a polymeric shell. Another embodiment of the present invention relates to a process for the continuous in situ preparation of heat fusible, or cold pressure fixable encapsulated toners comprised of a core containing a polymer resin, or plurality of polymer resins and magnetic pigment particlesm such as iron oxides or magnetites, encapsulated within a polymeric shell, such as a polyurethane, a polyester, a polyurea, and other known shell polymers. The encapsulated toners obtained with the processes of the present invention in embodiments possess a number of advantages including narrow particle size distribution, cold pressure fixability, low heat fusibility, high image fix, excellent powder flow characteristics, excellent surface release properties, and excellent toner shelf stability.

It is known that encapsulated toner can be prepared by a batch process. However, the batch process has several drawbacks, or disadvantages. For example, the processing down times can be extensive, for example from about 3 to about 6 hours, and hence volume/time yield can be relatively low, for example from about 2 to 4 times lower, compared with the continuous process of the present invention in embodiments; apparatus changeover and periodic addition of materials is needed, which not only increases the operating cost but also can cause product quality variation (batch-to-batch variation); and with low volume/time yield larger equipment, 2 to 4 times larger than continuous process equipment, is needed to achieve the same production volume, and this equipment may cause undesirable scalability problems and can increase costs. The equipment scaleup problem is particularly important because of the geometric dependence of the particle formation step and the unavailability of a manufacturing size homogenizer. These and other disadvantages are avoided, or minimized with the processes of the present invention.

Advantages associated with the continuous process of the present invention in embodiments includes high volume/time yields, such as 2 to 4 times higher than that obtained by batch process, no changeover of equipment, operation shutdown can be avoided, more consistent toner product quality since there is no or little batch to batch variation as is encountered in the batch process, smaller size equipment such as 2 to 4 times smaller than the prior art batch process can be used, and additional process variables such as flow rate, method of feeding, and recirculation rate can be readily selected for control of product quality.

Encapsulated toners and processes thereof, such as batch processes, are known as indicated herein. For example, both U.S. Pat. No. 4,626,489 and British Patent 1,538,787 disclose similar processes for colored encapsulated toners wherein both the core resin and shell materials are prepared by free radical polymerization techniques. U.S. Pat. No. 4,565,764 discloses a colored microcapsule toner comprised of a colored core encapsulated by two resin shells with the inner shell having an affinity for both the core and the outer shell materials; and U.S. Pat. No. 4,254,201 illustrates the use of pressure sensitive toner clusters or aggregates with each granule of the cluster or aggregate being comprised of a pressure sensitive adhesive substance encapsulated by coating film. Color pigment particles or magnetic particles can be present on the surfaces of the encapsulated granules to impart the desired color to the toners. Also, U.S. Pat. No. 4,727,011 discloses a process for preparing encapsulated toners which involves a batch shell forming interfacial polycondensation and a core binder forming free radical polymerization, and further U.S. Pat. No. 4,708,924 discloses the use of a mixture of two polymers, one having a glass transition temperature in the range of $-90°$ C. to $5°$ C., and the other having a softening temperature in the range of $25°$ C. to $180°$ C., as core binders for a pressure fixable encapsulated toner. Other prior art, all U.S. patents, include: U.S. Pat. No. 4,016,099, which discloses methods of forming encapsulated toner particles and wherein there are selected organic polymers including homopolymers and copolymers, such as vinylidene fluoride, tetrafluoroethylene, chlorotrifluoroethylene, and the like, see column 6, beginning at line 3, wherein there can be selected as the core materials polyolefins, polytetrafluoroethylene, polyethylene oxide and the like, see column 3, beginning at around line 18; U.S. Pat. No. 4,265,994 directed to pressure fixable capsule toners with polyolefins, such as polytetrafluoroethylene, see for example column 3, beginning at line 15; U.S. Pat. No. 4,497,885, which discloses a pressure fixable microcapsule toner comprising a pressure fixable component, a magnetic material, and other optional components, and wherein the core material can contain a soft material typical examples of which include polyvinylidenefluoride, polybutadiene, and the like, see column 3, beginning at line 10; U.S. Pat. No. 4,520,091 which discloses an encapsulated toner with a core which comprises a colorant, a dissolving solvent, a nondissolving liquid and a polymer, and may include additives such as fluorine containing resin, see column 10, beginning at line 27; U.S. Pat. No. 4,590,142 relating to capsule toners wherein additives such as polytetrafluoroethylenes are selected as lubricating components, see column 5, beginning at line 52; U.S. Pat. Nos. 4,599,289 and 4,803,144. The aforementioned prior art is believed to be silent with respect to the preparation of encapsulated toners by a continuous process as illustrated herein.

With further specific reference to the prior art, there are disclosed in U.S. Pat. No. 4,307,169 microcapsular electrostatic marking particles containing a pressure fixable core, and an encapsulating substance comprised of a pressure rupturable shell, wherein the shell is formed by an interfacial polymerization. One shell prepared in accordance with the teachings of this patent is a polyamide obtained by interfacial polymerization. Furthermore, there are disclosed in U.S. Pat. No. 4,407,922 pressure sensitive toner compositions comprised of a blend of two immiscible polymers selected from the group consisting of certain polymers as a hard component, and polyoctyldecylvinylether-co-maleic anhydride as a soft component. Interfacial polymerization processes are selected for the preparation of the toners of this patent.

In a patentability search report, references cited therein, all U.S. Patents and indicated as being only of collateral interest, include U.S. Pat. Nos. 5,071,451; 4,727,011; 4,851,318; 4,537,167; 4,954,412; 5,035,970 and 5,037,716.

The disclosures of all the United States patents and other patent documents mentioned herein are totally incorporated herein by reference.

A number of patents illustrate various encapsulated toner compositions and batch processes for the preparation thereof including, for example, U.S. Pat. No. 5,043,240, U.S. Pat. No. 5,035,970, U.S. Pat. No. 5,037,716, U.S. Pat. No. 5,045,428, U.S. Pat. No. 5,023,159 and U.S. Pat. No. 5,013,630, the disclosures of each of the aforementioned patents being totally incorporated herein by reference.

Generally, the known batch encapsulated toner processes involve dispersion in a vessel for an effective period of time of an oil phase comprised of a pigment, one or two core monomers and an oil soluble shell monomer in an aqueous solution containing a small fraction of surfactant using a rotor-stator homogenizer; thereafter transferring the resulting suspension to a batch reactor vessel equipped with a mechanical stirrer, subsequently adding to the batch reactor a water soluble monomer such as an amine, and effecting interfacial polymerization of the amine and oil soluble shell monomer such as isocyanate to form a polymeric shell, and then effecting free radical polymerization by heating of the core monomer at a temperature of from about 75° to 95° C.

Disadvantages associated with the aforementioned batch processes for the preparation of encapsulated toners include long processing times, from 8 to 15 hours for example, because of the times needed to charge the materials, transfer the materials from one vessel to another and discharge them, low volume/time yield, such as 2 to 4 times lower than that achieved by the continuous processes of the present invention in embodiments, of toner due to the long processing time and shutdown time which is needed for charging and discharging of materials and cleaning of the equipment; laborious apparatus changeover operations such as the transfer of a suspension from a particle formation mixing tank to a reactor and periodic addition of materials such as addition of amine to induce interfacial polymerization; shutdown of the operation after each toner run to discharge the material and clean the reactor; and batch to batch variation in the toner quality obtained due to preparation of a different batch by a different operator.

Disclosed in copending patent application U.S. Ser. No. 617,234 is the preparation of encapsulated toners by a batch process which comprises (1) dispersing a mixture of one or more core monomers, an oil-soluble free radical initiator or initiators, at least one oil-soluble shell precursor or monomer component, colorants, an optional preformed core resin, such as a styrene polymer, an acrylate polymer, a methacrylate polymer, a polyester, and the like present in an effective amount of, for example, from about 0 to about 50 weight percent of the total core polymers, and an optional diluent, by high shear blending into stabilized microdroplets having a specific droplet size and size distribution in an aqueous medium containing a surfactant or stabilizer; (2) initiating the shell-forming interfacial polycondensation by adding one or more water-soluble shell precursors or monomer components; (3) thereafter, effecting the core resin-forming free radical polymerization by heating, leading to the formation of encapsulated toner particles; and (4) treating the resulting encapsulated particles with a silane reagent. The core resin-forming free radical polymerization is generally conducted in a temperature range of from about 35° C. to over about 120° C., and preferably from about 45° C. to about 90° C., for a period of from about 1 to about 24 hours, depending primarily on the monomers and free radical initiators used.

DESCRIPTION OF FIGURE

There is illustrated in FIG. 1 an embodiment of the present invention which functions as illustrated hereinafter.

More specifically, in FIG. 1 there are illustrated storage tanks 1, 2 and 3 of an effective size, for example from about 2 liters to about 10 liters, wherein tank 1 contains an oil phase comprised of a mixture of monomer or monomers, initiators and pigment or colorant, tank 2 contains water and a surfactant and tank 3 contains water and a soluble shell monomer; a connecting tube 4 which functions as a conduit for the oil phase when pump 5 is rendered operative while connecting tube line 6 functions as a conduit for the surfactant solution when pump 7 is rendered operative, and connecting tube line 8 acts as a conduit for the water/soluble shell monomer when pump 9 is rendered operative; 10 represents a motor which has connected thereto a homogenizer 11; 12 represents a flowthrough mixing tank, and it is in this tank that there is formed a mixture of monomer, pigment, and initiator or an oil phase or oil droplet of a small size, for example from about 2 to about 25 and preferably about 15 microns in average particle diameter; an overflow tube 14 wherein the oil droplets overflow into a continuously stirred tank reactor 15 which contains a stirrer 16 connected to a motor 17 for the purpose of driving the stirrer in the direction of the arrow, and wherein there is formed in this tank an encapsulated polymeric shell around the oil droplets; overflow tube 18, which acts as a conduit for the product obtained in the continuously stirred reactor 15, and which product is permitted to flow into a reactor tank 19 when the valve 20 is in an open position and the valve 21 is in a closed position; reactor tank 19 containing a stirrer 23 connected to a motor 24 for the purpose of rotating the stirrer and a valve 26 which usually remains closed except when one desires to empty the tank or discharge the product into a holding tank not shown; and wherein tank 19 is immersed in an oil bath 27, which oil has been preheated to a temperature of from about 70° to about 95° C., and wherein there is caused the formation of the core polymer. Reactor tank 28 contains the same components as reactor tank 19. When these tanks are emptied, as indicated herein, into a holding tank or tanks, the mixture exiting from the reactor tanks is usually hot and is allowed to cool in the holding tank. After cooling, the encapsulated toner product is removed from the holding tank and dried to enable encapsulated toner compositions. Both valves 20 and 21 may also remain open in embodiments, however, usually one is closed until the reactor tank 19 or 28 becomes filled; thus when tank 19 is filled valve 20 is closed and is emptied while tank 28 is being filled and valve 21 is open. The aforementioned opening and closing of the valves can be repeated continuously.

SUMMARY OF THE INVENTION

Figure 1:
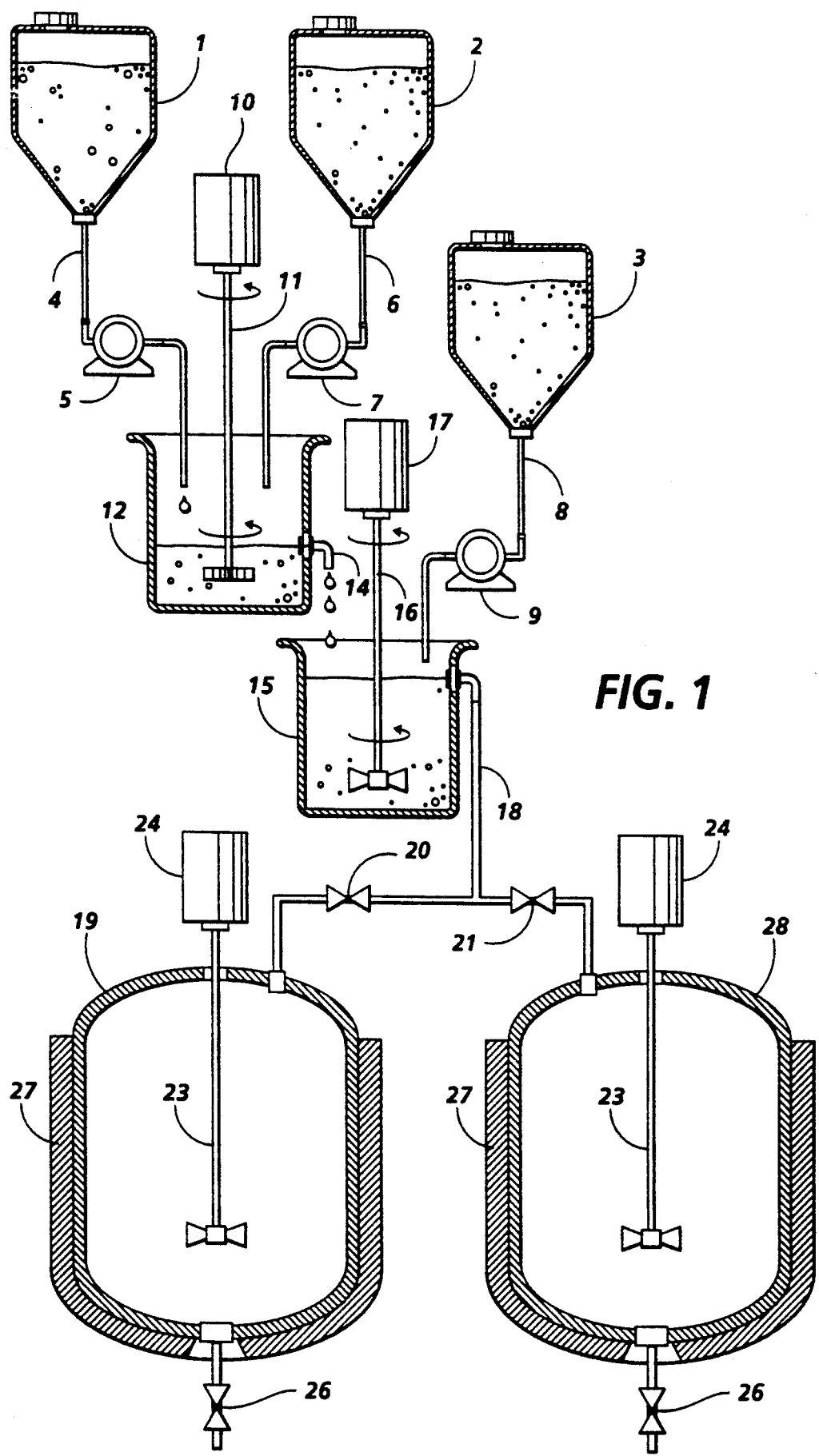

It is an object of the present invention to provide processes for the continuous preparation of encapsulated toner compositions with many of the advantages illustrated herein.

In another objected of the present invention there is provided a process for the continuous preparation of encapsulated toner compositions comprised of a core encapsulated in a polymer shell, and which toner can posses a small average volume particle diameter of from about 3 to about 25 microns as determined by Coulter Counter measurements.

In another object of the present invention there are provided processes with high volume/time yield such as 2 to 4 times higher than that obtained by batch process for the preparation of encapsulated toner compositions comprised of a core comprised of an addition polymer resin and colorants, a polymeric shell, and wherein there can be continuously formulated both cold pressure fixable and heat pressure fixable toners by interfacial polymerization for the formation of shell polymer, and free radical polymerization for the formation of the core polymer or polymers.

A further object of the present invention is to provide processes for encapsulated toners with narrow size distribution such that the particle geometric standard deviation ranges from about 1.23 to 2.40.

A further object of the present invention is to provide continuous process for encapsulated toners wherein the oil phase viscosity ranges from about 10 to 300,000 centipoise.

A further object of the present invention is to provide a simple preparative process for small sized toners with narrow size distribution without the need to resort to conventional pulverization and classification techniques.

Also, a further object of the present invention is to provide in embodiments continuous in situ processes for encapsulated toners in high yields with the following advantages high volume/time yield, no changeover of equipment, no operation shutdown, more consistent product quality, the selection of compact, smaller size equipment for production, the availability of additional process variables for the control of product quality, the ability to process high viscosity materials, and the generation of toner particles with narrow size distribution and small particle diameters.

These and other objects of the present invention can be accomplished by the provision of processes for encapsulated toners, and more specifically continuous processes for the preparation of encapsulated toners. In one embodiment of the present invention, there are provided processes for the preparation of encapsulated toners with a core comprised of a polymer resin derived from the free radical polymerization of monomer, or a plurality of monomers, for example up to 5 monomers, an optional preformed polymer resin, and colorants such as dyes, magnetic, color pigment particles, or mixtures thereof encapsulated within a polymeric coating.

The continuous process of the present invention comprises in embodiments continuously feeding to a reactor an oil phase containing core monomers, pigment mixture and oil soluble shell monomer and an aqueous phase containing surfactant, or premixing the oil and aqueous phase, and feeding the resulting mixture into a continuous flow through mixing tank; homogenizing the two phases to form small oil droplets of, for example, from between about 3 to about 25 microns in average diameter; overflowing the resulting droplets by, for example, an overflow tube to a second continuous stirred tank reactor or a series of continuous stirred tank reactors, up to 10, and preferably up to 4 while simultaneously feeding water soluble shell monomer and stirring the resulting mixture to effect interfacial polymerization thereby causing shell formation, and thereafter flowing the encapsulated droplets preferably via an overflow tube preferably connected to the second stirred tank to a batch reactor or two or more polymerization reactors and heating the reactor or reactors to a temperature of, for example, from between about 75° to 95° C., to cause free radical polymerization of the core monomer which heating is accomplished for an effective period of time of, for example, from about (throughout this includes between) 4 to about 10 hours. After free radical polymerization, cooling can be affected by termination of heating and allowing the product to remain at room temperature, about 25° C. for example, for an effective period of time of, for example, from about 10 to 16 hours. After cooling, filtration by, for example, suction filtration, and the like is accomplished to enable the solid toner product. The filtered wet toner particles are dried using, for example, spray drying.

In embodiments, the oil phase and aqueous phase, separately stored in two storage tanks (tank size in embodiments is, for example, from about 2 to about 10 liters), are metered individually at a flow rate of 10 to 5,000 grams/minute into a flowthrough tank by appropriate pumps. For high viscosity materials such as the oil phase containing magnetite pigment, it is preferable to use for feeding a twin-screw feeder, such as the K-Tron Feeder. Feeding of the oil phase into tank 12 could be achieved via the top or bottom of the tank. Tank 12 has two inlet lines 4 and 6 for the introduction of the two phases and an overflow outlet for product exit, and is equipped with 11, a rotor-stator homogenizer or a saw-tooth disperser, positioned in the center of the tank. The speed of the rotor-stator homogenizer or saw-tooth disperser ranges, for example, from about 1,000 to 14,000 rpm. Once entering tank 12, the two phases are intensely mixed and small oil droplets, suspended in the aqueous phase, are formed and overflowed into the next tank 15 or a series of tanks through the overflow outlet 14 of tank 12, and simultaneously the contents of tank 3 of water and soluble shell monomer are fed into tank 15 by rendering operative motor 9. Tank 12 is a continuous stirred tank reactor, wherein droplets can be encapsulated by interfacial polymerization. In tank 12, a water soluble shell monomer such as a di- or polyfunctional amine is present, and reacts with the oil soluble shell monomer to form the oil phase at the interface of the droplets and then to form the polymeric shell capsule walls.

After the shell or shells have been formed, the encapsulated particles can be polymerized in a large batch like tank 19 by heating the reactor to a temperature of from about 75° to about 95° C. for 4 to 10 hours or in two or more parallel reactors, tanks 19 and 28. For a system with two parallel reactors, the encapsulated particles comprised of shell and core monomers are first introduced into one of the two free radical polymerization reactors. After the first reactor is filled, the line is switched to the second reactor by manipulation of the valves installed in the system. At the same time, polymerization is initiated by heating up the first reactor.

The system is designed in such a way that when the second reactor is just about to fill, the polymerization in the first reactor is completed and the toner suspension can be discharged through the bottom of the reactor. When the second tank or reactor is filled, the feed line is then switched back to the first reactor, which is now empty. Polymerization in the second reactor is then initiated. Thus, the filling time for each reactor can be equal to the sum of polymerization time and reactor discharging time. The procedure can be repeated thereby causing no interruption in the continuous operation of the process. The aforementioned core resin-forming free radical polymerization is generally conducted in a temperature range of from about 35° C. to over about 100° C., and preferably from about 75° C. to about 95° C. for a period of from about 1 to about 24 hours, and preferably 3 to 12 hours, depending primarily on the monomers and free radical initiators used.

The core resin comprises about 10 to about 70 percent by weight of the toner. Examples of core resins selected include, for example, acrylic, methacrylic, styryl and olefinic polymers. Suitable addition monomers for the core resin-forming free radical polymerization can be selected from the group consisting of methyl acrylate, methyl methacrylate, ethyl acrylate ethyl methacrylate, propyl acrylates, propyl methacrylates, butyl acrylates, butyl methacrylates, pentyl acrylates, pentyl methacrylates, hexyl acrylates, hexyl methacrylates, heptyl acrylates, heptyl methacrylates, octyl acrylates, octyl methacrylates, cyclohexyl acrylate, cyclohexyl methacrylate, lauryl acrylates, lauryl methacrylates, stearyl acrylates, stearyl methacrylates, benzyl acrylate, benzyl methacrylate, ethoxypropyl acrylate, ethoxypropyl methacrylate, methylbutyl acrylates, methylbutyl methacrylates, ethylhexyl acrylates, ethylhexyl methacrylates, methoxybutyl acrylates, methoxybutyl methacrylates, cyanobutyl acrylates, cyanobutyl methacrylates, tolyl acrylate, tolyl methacrylate, styrene, substituted styrenes, other substantially equivalent addition monomers, and other known addition monomers, reference for example U.S. Pat. No. 4,298,672, the disclosure of which is totally incorporated herein by reference, and mixtures thereof.

The colorants contained in the oil phase comprise about 5 to about 75 percent by weight of the toner. Various known colorants, including magnetic pigments, may be selected for the toner compositions and processes of the present invention providing, for example, that they do not interfere with the shell forming and core resin forming polymerization reactions. Typical magnetic pigments, preferably present in an effective amount of, for example, from 1 to about 60 weight percent of toner, include Mobay magnetites MO8029 ™, MO8060 ™; Columbian MAPICO BLACKS ® and surface treated magnetites; Pfizer magnetites CB4799, CB5300, CB5600, MCX636; Bayer magnetites BAYFERROX 8600 ™; Northern Pigments magnetites NP-604 ™, NP-608 ™; and Magnox magnetites TMB-100 ™ or TMB-104 ™. Typical examples of other colorants inclusive of dyes and color pigments, preferably present in an effective amount of, for example, from about 0 to about 10 weight percent of the toner, include carbon black like REGAL 330 ® carbon black available from Cabot Corporation, PALIOGEN VIOLET 5100 ™ and 5890 ™ (BASF), NORMANDY MAGENTA RD-2400 ™ (Paul Uhlich), PERMANENT VIOLET VT2645 ™ (Paul Uhlich), HELIOGEN GREEN L8730 ™ (BASF), ARGYLE GREEN XP-111-S ™ (Paul Uhlich), BRILLIANT GREEN TONER GR 0991 ™ (Paul Uhlich), LITHOL SCARLET D3700 ™ (BASF), TOLUIDINE RED ™ (Aldrich), Scarlet for THERMOPLAST NSD RED ™ (Aldrich), LITHOL RUBINE ™ TONER (Paul Uhlich), LITHOL SCARLET 4440 ™ (BASF), BON RED C ™ (Dominion Color), ROYAL BRILLIANT RED RD-8192 ™ (Paul Uhlich), ORACET PINK RF ™ (Ciba Geigy), PALIOGEN RED 3340 ™ and 3871K ™ (BASF), LITHOL FAST SCARLET L4300 ™ (BASF), HELIOGEN BLUE D6840 ™, D7080 ™, K6902 ™ and L7020 ™ (BASF), SUDAN BLUE OS ™ (BASF), NEOPEN BLUE FF4012 ™ (BASF), PV FAST BLUE B2G01 ™ (American Hoechst), IRGALITE BLUE BCA ™ (Ciba Geigy), PALIOGEN BLUE 6470 ™ (BASF), Sudan ™ II, III and IV (Matheson, Coleman, Bell), SUDAN ORANGE ™ (Aldrich), SUDAN ORANGE 220 ™ (BASF), PALIOGEN ORANGE 3040 ™ (BASF), ORTHO ORANGE OR 2673 ™ (Paul Uhlich), PALIOGEN YELLOW 152 ™ and 1560 ™ (BASF), LITHOL FAST YELLOW 0991K ™ (BASF), PALIOTOL YELLOW 1840 ™ (BASF), NOVOPERM YELLOW FGL ™ (Hoechst), PERMANENT YELLOW YE 0305 ™ (Paul Uhlich), LUMOGEN YELLOW D0790 ™ (BASF), SUCO-GELB L1250 ™ (BASF), SUCO-YELLOW D1355 ™ (BASF), SICO FAST YELLOW D1355 ™ and D1351 ™ (BASF), HOSTAPERM PINK E ™ (Hoechst), FANAL PINK D4830 ™ (BASF), CINQUASIA MAGENTA ™ (Dupont), PALIOGEN BLACK L0084 ™ (BASF), PIGMENT BLACK K801 ™ (BASF) and carbon blacks such as REGAL 330 ™ (Cabot), CARBON BLACK 5250 ™ and 5750 ™ (Columbia Chemicals). Generally, magnetites, cyan, magenta, yellow, red, green, blue pigments or mixtures thereof may be selected.

Illustrative examples of suitable known surfactants or stabilizers selected for the process of the present invention include poly(vinyl alcohol), partially hydrolyzed poly(vinyl alcohol), methyl cellulose, ethyl cellulose, hydroxypropyl cellulose, hydroxyethylmethyl cellulose, and the like. The effective concentration of surfactant in the aqueous phase ranges, for example, from about 0.1 percent by weight to about 5 percent by weight with the preferred amount being determined primarily by the toner precursor materials and the desired toner particle size of, for example, 2 microns to about 20 microns. In embodiments, inorganic surfactants may also be utilized in combination with the organic surfactant for achieving a smaller microdroplet size of, for example, less than 9 microns. Illustrative examples of suitable inorganic surfactants include barium sulfate, lithium phosphate, tricalcium phosphate, potassium oleate, potassium caprate, potassium stearate, sodium laurate, sodium dodecyl sulfate, sodium oleate, sodium laurate, colloidal silica, and the like. The effective concentration of inorganic surfactant that is effective in reducing the microdroplet size to below 9 microns and, for example, from about 2 to about 7 microns in average volume diameter ranges, for example from about 0.005 to about 1.0 percent by weight, and preferably from about 0.01 to about 0.20 percent by weight.

Two or more shell precursors or monomers can be selected for the processes of the present invention. Shell formation results when the two shell monomers or precursors undergo polycondensation at the microdroplet/water interface. Exemplary shell materials include, for example, polyurea, polyurethane, polyester, polyamide and other condensation polymers, as illustrated in U.S. Pat. No. 4,877,706, the disclosure of which is totally incorporated herein by reference, and the like. Exemplary shell monomers or precursors present in the microdroplet phase are polyisocyanates, polyacyl halides, polyhaloformates and the like, and are preferably selected from the group consisting of polyisocyanates, such ad benzene diisocyanate, toluene diisocyanate, diphenylmethane diisocyanate, hexamethylene diisocyanate, cyclohexane diisocyanate, bis(4-isocyanatocyclohexyl)methane, polymethylene polyphenyl isocyanates, PAPI 27 TM, PAPI 135 TM, PAPI 94 TM, PAPI 901 TM, MONDUR MR TM, MONDUR MRS TM, MONDUR MRS-10 TM, modified diphenylmethane diisocyanates, ISONATE 143L TM, ISONATE 181 TM, ISONATE 191 TM, ISONATE 240 TM, MONDUR PF TM, and MONDUR XP-744 TM, modified toluene diisocyanates, MONDUR CB60 TM, MONDUR CB-601 TM, MONDUR CB-75 TM, aliphatic polyisocyanates, DESMODUR W TM, DESMODUR N-75 TM, DESMODUR N-751 TM, DESMODUR N-100 TM, DESMODUR L-2291A TM, DESMODUR Z-4370 TM, DESMODUR Z-4370/2 TM, polyether Vibrathanes B-604, B-614, B-635, B-843, polyether isocyanate prepolymers E-21 or E-21A, XP-743, XP-744, and the like, polyacyl halides such as adipoyl chloride, fumaryl chloride, suberoyl chloride, succinyl chloride chloride, phthaloyl chloride, isophthaloyl chloride, terephthaloyl chloride; and polyhaloformates such as ethylene glycol bischloroformate, diethylene glycol bischloroformate, and triethylene bischloroformate. Exemplary water soluble shell monomers or precursors that are added to the aqueous phase to initiate shell formation include polyamines such as ethylenediamine, tetramethylenediamine, pentamethylenediamine, hexamethylenediamine, p-phenylenediamine, m-phenylenediamine, hydroxytrimethylenediamine, methylpentamethylenediamine, diethylenetriamine, triethylenetetraamine, tetraethylenepentaamine, diaminooctane, xylylene diamine, bis(hexamethylene)triamine, tris(2-aminoethyl)amine, 4,4'-methylenebis(cyclohexylamine), bis(3-aminopropyl)ethylenediamine, 1,3-bis(aminomethyl)cyclohexane, 1,5-diamino-2-methylpentane, piperazine, 2-methylpiperazine, 2,5-dimethylpiperazine, and 1,4-bis(3-aminopropyl)piperazine; and polyols such as butanediol, hexanediol, bisphenol A, bisphenol Z, and the like. When desired, a water soluble crosslinking agent, such as triamine or triol, can also be added to improve the mechanical strength of the shell polymer. The thickness of the shell can generally be adjusted to be less than 2 microns, and preferably to be less than 0.5 micron, provided that the desired mechanical strength of the shell can be maintained. Interfacial polymerization processes selected for the shell formation of the toners of the present invention are as illustrated, for example, in U.S. Pat. Nos. 4,000,087 and 4,307,169, the disclosures of which are totally incorporated herein by reference.

The free radical polymerization initiator, which is usually contained in the oil phase, comprises about 0.1 to about 3 percent by weight of the oil phase in embodiments. Suitable known free radical initiators selected for the core resin-forming free radical polymerization include azo-type initiators such as 2-2'-azobis(dimethylvaleronitrile), azobis(isobutyronitrile), azobis (cyclohexanenitrile), azobis(methylbutyronitrile), mixtures thereof, and the like, peroxide initiators such as benzoyl peroxide, lauroyl peroxide, methyl ethyl ketone peroxide, isopropyl peroxycarbonate, 2,5-dimethyl-2,5-bis(2-ethylhexanoylperoxy)hexane, di-tert-butyl peroxide, cumene hydroperoxide, dichlorobenzoyl peroxide, and mixtures thereof, with the quantity of initiator being, for example, from about 0.1 percent to about 10 percent by weight of that of core monomer. Water-soluble free radical inhibitors can also be employed to suppress or inhibit emulsion polymerization in the aqueous phase. The emulsion polymerization in the aqueous phase, if uninhibited or unsuppressed, could in embodiments result in the formation of unwanted emulsion-polymerized polymer particles, which may contaminate the desired encapsulated particle product. Illustrative examples of water-soluble free radical inhibitors include copper salts, ammonium thiocyanate, sodium nitrite, and the like. In situations where addition monomers having some solubility in water are utilized for the preparation of core resin, it may be advantageous to dissolve some metal salts such as postassium chloride, potassium sulfate, sodium chloride, sodium sulfate and the like, in the aqueous phase to suppress their solubility in water.

Surface additives can be selected for the toners formed with the processes of the present invention including, for example, metal salts, metal salts of fatty acids, colloidal silicas, powdered metal oxides, mixtures thereof, and the like, which additives may be present in an amount of from about 0.1 to about 5 weight percent, reference U.S. Pat. Nos. 3,590,000; 3,720,617; 3,655,374 and 3,983,045, the disclosures of which are totally incorporated herein by reference. Preferred additives include zinc stearate, AEROSIL ® and powdered metal oxides.

In embodiments, charge control or conductive additives can be applied to the surface of the obtained encapsulated toners to control respectively their triboelectric or electroconductive characteristics. Illustrative examples of charge control additives include powdered conductive metal oxides, quaternary ammonium salts, organometallic complexes or salts of salicylic acids, catechols, and the like. Exemplary conductive additives include carbon blacks, graphites, conductive metal oxides, and the like. For two component development, known carrier particles including steel ferrites, copper zinc ferrites, and the like, with or without coatings, can be admixed, for example, from about 1 to about 5 parts of toner per about 100 parts of carrier with the encapsulated toners of the present invention, reference for example the carriers illustrated in U.S. Pat. Nos. 4,937,166; 4,935,326; 4,883,736; 4,560,635; 4,298,672; 3,839,029; 3,847,604; 3,849,182; 3,914,181; 3,929,657 and 4,042,518, the disclosures of which are totally incorporated herein by reference.

The encapsulated toners of the present invention can be utilized in various imaging systems as mentioned herein including, more specifically, those wherein latent images are developed on an imaging member and subsequently transferred to a supporting substrate and affixed thereto by cold pressure rollers, heat and/or a combination of heat and pressure.

By continuous in embodiments is meant the use of continuous flow reactors, that is the reactant mixture flows into the reactor, reacts inside the reactor, then flows out, or exits the reactor, which reactors can be connected in series wherein materials will flow from one reactor to another, and wherein the dispersion is prepared in a continuous flowthrough mixing tank, and shell polymerization is accomplished in a continuous stirred reactor.

The following Examples are being submitted to further illustrate various embodiments of the present invention. These Examples are intended to be illustrative only and are not intended to limit the scope of the present invention. A comparative Example is also provided.

EXAMPLE I

This example illustrates the continuous production of an encapsulated toner for single component development cold pressure fixable xerographic process with the continuous process of the present invention, reference FIG. 1 for example.

An oil phase comprised of a mixture of 61.9 percent of magnetite iron oxide powder (MO8029, supplied by Pfizer Corporation), 2.40 percent of core monomer of n-lauryl methacrylate (supplied by Polysciences Inc), 9.4 percent of shell monomer of toluene isocyanate (TDI-80, manufactured by Olin Chemical), 4.3 percent of the shell crosslinking agent DESMODUR RF ™, (−20 percent of tris(4-isocyanatophenyl) thiophosphate in dichloromethane, manufactured by Bayer Chemicals), and 0.4 percent of dissolved free radical polymerization initiator, VAZO 64 ™, 2-2' azobis-dimethyl-valeronitrile (manufactured by E. I. DuPont), was continuously metered by a connected feed line into a flow-through 670 milliliter stainless steel mixing tank using a twin-screw K-TRON feeder, Model T-35 (manufactured by K-TRON Corporation) equipped with a SCR controller to control the speed of the screw rotation, and hence, the feed rate of the oil phase. The viscosity of the oil phase was about 300,000 centipoise, and the oil phase was fed from the top of a storage tank at feed rate of 51.1 grams/minute. An aqueous phase, which contained 0.05 percent by weight of 88 percent hydrolyzed polyvinylalcohol (average molecular weight 77,000 to 79,000) in water, was then pumped from a second storage tank into the flowthrough mixing tank using a piston-cylinder type pump, FMI RPG400 (manufactured by Fluid Metering, Inc.), at a rate of 119 grams/minute. The diameter of the flowthrough mixing tank was 10.3 centimeters and the height from the bottom up to a connected overflow tube was 8.0 centimeters. This tank was equipped with a Brinkmann Model PT50/80 Homogenizer, 11, (supplied by Brinkmann) with its generator positioned near the center of the tank. The speed of the homogenizer was set at 8,000 rpm. The continuous shearing and cavitation generated by the homogenizer resulted in the continuous formation of small oil droplets.

The droplets thus produced were introduced into a continuously stirred tank reactor 15 via the connected overflow tube 14. A solution of diethylenetriamine (DETA, supplied by Aldrich, DETA:water=3:5) was metered from a storage tank 3 into tank 15 using a FMI pump, Model RPG20. The DETA reacts with toluene isocyanate and DESMODUR RF ™ from the oil phase and forms capsule walls at the interface of the droplets. The diameter of tank 15 was 16.4 centimeters and the height up to the overflow tube was 14.0 centimeters, and this tank had a capacity of 2,957 milliliters. The formed encapsulated droplets move via an overflow tube 18 into a batch polymerization reactor 19 when valve 20 is open wherein the core monomer was polymerized by heating the reactor to 85° C.

The operating conditions used in this Example were as follows: flow rate of oil phase=51.1 grams/minute, flow rate of aqueous phase=119.0 grams/minute, flow rate of DETA solution=6.4 grams/minute, temperation for free radical polymerization of the core monomer: 1° C./minute to 85° C. and remained at 85° C. for 3.5 hours.

After free radical polymerization by heating, followed by exiting of the heated products by opening valve 26 to a holding tank, there resulted after cooling encapsulated toner comprised of about 16 percent of a polyurea shell, 24 percent of core polymer of polylaurylmethacrylate and 60 percent of magnetite. The formed encapsulated toner particles had a mean volume size ($d_{50}$) of 17.6 microns and a geometric standard deviation (gsd) of 1.28, which represents a narrow particle size distribution, as determined by Coulter Counter measurements. The throughput or volume/time yield was 51 grams/minute. Print quality was evaluated with the prepared encapsulated toner using a 4060 ionographic printer and found to be excellent, with no background or offset/smearing visible on the developed images.

COMPARATIVE EXAMPLE I

This is a comparative example where a prior art batch process was used to prepare an encapsulated toner for a single component development cold pressure fixable xerographic process.

In a 2 liter vessel, 511 grams of an oil phase with the same composition as Example I were dispersed in 1,000 grams of aqueous phase of 0.05 percent polyvinylalcohol using a Brinkmann PT45/80 homogenizer operating at 9,000 rpm for 4 minutes. The resulting suspension was then transferred to a batch reactor where an amine solution was added, followed by stirring at 300 rpm for 30 minutes to form the capsule walls. After shell formation, the reactor was heated at a rate of 1° C./minute to 85° C. and remained at 85° C. for 3.5 hours to polymerize the core monomer.

After free radical polymerization by heating, there was obtained an encapsulated toner with the same components of Example I. However, Coulter Counter measurements indicated that the toner particles had a mean volume size ($d_{50}$) of 17.4 microns and a geometric standard deviation (gsd) of 1.34, which is much wider than that obtained with the process of Example I. The throughput or volume/time yield was estimated to be about 25 grams/minute, which is only half of that achieved in Example I. This Example thus demonstrates, for example, that the continuous process of Example I has a much higher volume/time yield and produces toner particles with narrower size distribution.

EXAMPLE II

This Example illustrates the preparation of a cyan heat fusible toner composition by repeating the process of Example I. The equipment used was similar to that described in Example I except that the oil phase was pumped by a Micropump Model 900-573 (manufactured by Barnant Company) into the flowthrough mixing tank via the bottom of the storage tank. The encapsulated droplets were polymerized in a batch polymerization reactor at 85° C. for 4 hours.

The materials and operating conditions were as follows: (i) oil phase (flow rate=31.1 grams/minute): 5.4 percent of HELIOGEN BLUE ™ pigment (supplied by BASF Corporation), 48.6 percent of styrene, 32.4 percent of n-lauryl methacrylate and 13.6 percent of meta-tetramethylxylene diisocyanate (manufactured by American Cyanamid Company), (ii) aqueous phase (flow rate=102.0 grams/minute): 0.75 percent of TYLOSE ™ (methylcellulose, manufactured by Fluka) in water, and (iii) amine solution (flow rate=9.3 grams/minute): 30.5 percent of DYTEK A ™ (2-methylpentanediamine, purchased from DuPont Chemicals).

After free radical core polymerization by heating as in Example I, an encapsulated toner comprised of 19 percent of a polyurea shell, 74 percent of core copolymer of n-lauryl methacrylate and styrene, and 7 percent of HELIOGEN BLUE ™ pigment was formed. The mean particle size of the encapsulated toner product was 8.5 microns, and the geometric standard deviation (gsd) was 1.40, as measured by Coulter Counter.

EXAMPLE III

Example I was repeated with a different set of operating conditions. The homogenizer speed was set at 6,000 rpm. The flow rate of the oil phase was 45 grams/minute, and that of the aqueous phase was 125 grams/minute. The shell and core polymerization was accomplished in the same manner as Example I.

After free radical polymerization, the composition of the encapsulated toner was the same as the toner produced in Example I. Coulter Counter measurements showed that the toner particles had a mean volume size ($d_{50}$) of 23.0 microns and a geometric standard deviation (gsd) of 1.24, which represents a very narrow particle size distribution.

EXAMPLE IV

The process of Example I was repeated with the following set of operating conditions. The homogenizer speed was set at 7,000 rpm. The flow rate of the oil phase was 39.6 grams/minute, and the flow rate of the aqueous phase, 132 grams/minute. The shell and core polymerization was carried out in the same manner as Example I.

After free radical polymerization, the encapsulated toner composition formed was comprised of the same components of the toner product of Example I. Coulter Counter measurements evidenced that the encapsulated toner particles had a mean volume size ($d_{50}$) of 20.0 microns and a geometric standard deviation (gsd) of 1.25, which represents a very narrow particle size distribution.

EXAMPLE V

The process of Example I was repeated with another set of operation conditions. The homogenizer speed was set at 8,000 rpm. The flow rate of the oil phase was 19.5 grams/minute, and the flow rate of the aqueous phase was 64.9 grams/minute.

After free radical polymerization, there was formed an encapsulated toner with the same components as the encapsulated toner of Example I. Coulter Counter measurement showed that the toner particles had a mean volume size ($d_{50}$) of 12.3 microns and a geometric standard deviation (gsd) of 1.35, which represents a narrow particle size distribution.

Other modifications of the present invention will occur to those skilled in the art subsequent to a review of the present application. These modifications, and equivalents thereof are intended to be included within the scope of this invention. One such embodiment is directed to a continuous process for the preparation of encapsulated toners wherein core particle formation is initiated in a flowthrough mixing tank, adding the core formed to a continuously stirred reactor tank while simultaneously adding shell comonomer, and wherein the polymeric shell or toner capsule wall is formed, and thereafter, polymerizing by heating to generate the core polymer, followed by cooling the resulting encapsulated toner.

What is claimed is:

1. A process for the continuous preparation of an encapsulated toner comprised of a core comprised of polymer and pigment encapsulated within a polymer shell, consisting essentially of continuously separately feeding an oil phase containing core monomers, oil soluble shell monomers and pigment and an aqueous phase containing surfactant into a continuous flowthrough mixing tank; homogenizing the aforementioned two phases to enable small oil droplets with an average diameter of from between about 3 to about 25 microns; overflowing the resulting droplets to at least one continuously stirred tank reactor while simultaneously feeding water soluble shell monomer to said stirred reactor to effect interfacial polymerization thereby causing shell formation; and thereafter allowing the encapsulated droplets to flow into a reactor or reactors and heating the reactor or reactors to effect free radical polymerization of the core monomers, followed by cooling, and isolating the said encapsulated toner.

2. A process in accordance with claim 1 wherein the oil phase and aqueous phase are premixed prior to being fed into the continuous flow through mixing tank.

3. A process in accordance with claim 1 wherein the continuously feeding of the oil phase is achieved by a pump or twin-screw feeder.

4. A process in accordance with claim 1 wherein the continuous feeding of the oil phase into the continuous flowthrough mixing tank is achieved via the top or bottom of said tank.

5. A process in accordance with claim 1 wherein the feed rate of the oil phase is from between about 10 to about 1,000 grams/minute, and the feed rate of the aqueous phase is from between about 50 to about 5,000 grams/minute.

6. A process in accordance with claim 1 wherein the ratio of the feed rate of the oil phase to the feed rate of the aqueous phase is from about 0.05 to about 1.0.

7. A process in accordance with claim 1 wherein the continuous flowthrough mixing tank contains a rotor-stator homogenizer or saw-tooth disperser.

8. A process in accordance with claim 7 wherein the speed of the rotor-stator homogenizer or saw-tooth disperser is from about 1,000 to about 14,000 revolutions per minute.

9. A process in accordance with claim 1 wherein the continuous microencapsulation is achieved by overflowing the oil droplets via a connected overflow tube to a continuously stirred tank reactor or a series of continuously stirred tank reactors while simultaneously feeding a water soluble shell monomer to effect interfacial polymerization of the oil and water soluble monomers.

10. A process in accordance with claim 1 wherein the core polymer is formed from comonomers polymerized via free radical polymerization in said reactor, or said reactors.

11. A process in accordance with claim 1 wherein the core comonomers are polymerized via free radical polymerization in two or more connected parallel polymerization reactors.

12. A process an accordance with claim 1 wherein the resulting encapsulated toners possess an average particle volume diameter of from about 3 to about 15 microns, a particle geometric standard deviation of from about 1.23 to about 2.40, and an oil phase viscosity of from about 10 to about 300,000 centipoise.

13. A process in accordance with claim 1 wherein the core polymer is an addition polymer selected from the group consisting of styrene, acrylate, and methacrylate polymers, and the shell polymer is selected from the group consisting of polyurea, polyester, polyurethane, polyamide, and mixtures thereof.

14. A process in accordance with claim 1 wherein the pigments are cyan, yellow, magenta, red, green, blue, brown and black, magnetites or mixtures thereof.

15. A process in accordance with claim 2 wherein there are added to the encapsulated toner formed surface additives comprised of conductive metal oxides, metal salts, metal salts of fatty acids, colloidal silicas, quaternary ammonium salts, sulfonamides, sulfonimides, organometallic complexes and salts, or mixtures thereof.

16. A process in accordance with claim 1 wherein the polymeric shell is formed by interfacial polymerization, the core resin is formed by free radical polymerization, and said free radical polymerization is accomplished at a temperature of from about 75° C. to about 95° C.

17. A process in accordance with claim 1 wherein there are selected for core formation free radical polymerization initiators selected from the group consisting of 2-2'-azobis(dimethylvaleronitrile), azobis(isobutyronitrile), azobis(cyclohexanenitrile), azobis(methylbutyronitrile), and mixtures thereof, peroxide initiators selected from the group consisting of benzoyl peroxide, lauroyl peroxide, methyl ethyl ketone peroxide, isopropyl peroxycarbonate, 2,5-dimethyl-2,5-bis(2-ethylhexanoylperoxy)hexane, di-tert-butyl peroxide, cumene hydroperoxide, dichlorobenzoyl peroxide, and mixtures thereof, with the amount of initiator being from about 0.1 percent to about 10 percent by weight of that of core monomer.

18. A process in accordance with claim 1 wherein the oil and aqueous phase are premixed prior to feeding the mixture into said continuous flowthrough mixing tank, and wherein said overflowing is into 10 continuously stirred tank reactors.

19. A process for the continuous preparation of encapsulated toner comprised of a core comprised of a polymer resin, or a plurality of resins and colorants, which core is encapsulated within a polymer shell, consisting essentially of continuously feeding an oil phase containing core monomer or monomers, oil soluble shell monomer or monomers and pigment, and an aqueous phase comprised of water and surfactant into a continuous flowthrough mixing tank; homogenizing the two phases to produce oil droplets; overflowing the resulting droplets via an overflow tube attached to the flowthrough mixing tank to at least one continuously stirred tank reactor while simultaneously feeding water soluble shell monomer or monomers to said stirred reactor to effect interfacial polymerization thereby causing shell formation, and thereafter allowing the encapsulated droplets to flow to a reactor and heating the reactor to cause free radical polymerization of the core monomers.

20. A process in accordance with claim 19 wherein subsequent to said polymerization of the core the product resulting is cooled, and wherein the encapsulated toner product has an average volume diameter in the range of from about 3 to about 25 microns.

21. A process in accordance with claim 1 wherein said oil phase is comprised of a mixture of iron oxide powder, a core monomer of lauryl methacrylate, and a shell monomer of toluene diisocyanate, and free radical polymerization initiater, said aqueous phase contains hydrolyzed polyvinyl alcohol and water, the pigment is cyan, and there results an encapsulated toner with a mean particle size of about 8 microns and a geometric standard deviation of about 1.40; and wherein the continuous flowthrough mixing tank contains a homogenizer operating at a speed of from about 6,000 to about 8,000 revolutions per minute.

22. A process in accordance with claim 21 wherein the encapsulated toner has a mean volume size of 23 microns and a geometric standard deviation of 1.24.

23. A process in accordance with claim 21 wherein the encapsulated toner has a mean volume size of 20 microns and a geometric standard deviation of 1.25.

24. A process in accordance with claim 21 wherein the encapsulated toner has a mean volume size of 12.3 microns and a geometric standard deviation of 1.35.

* * * * *